(12) United States Patent
Kriel (10) Patent No.: US 9,080,723 B2
(45) Date of Patent: Jul. 14, 2015

(54) PERSONNEL CLASSIFICATION AND RESPONSE SYSTEM

(75) Inventor: Bradley Scott Kriel, Pittsburgh, PA (US)

(73) Assignee: Caterpillar Inc., Peoria, IL (US)

( * ) Notice: Subject to any disclaimer, the term of this patent is extended or adjusted under 35 U.S.C. 154(b) by 480 days.

(21) Appl. No.: 13/474,091

(22) Filed: May 17, 2012

(65) Prior Publication Data

US 2013/0307978 A1 Nov. 21, 2013

(51) Int. Cl.
*H04N 7/18* (2006.01)
*F16P 3/14* (2006.01)
*G06K 9/32* (2006.01)
*G06K 9/00* (2006.01)
*G08B 21/02* (2006.01)

(52) U.S. Cl.
CPC ............... *F16P 3/142* (2013.01); *F16P 3/147* (2013.01); *G06K 9/00805* (2013.01); *G06K 9/3216* (2013.01); *G08B 21/02* (2013.01)

(58) Field of Classification Search
CPC ........... G06K 9/00791; G06K 9/3216; G06K 9/00805; F16P 3/147; F16P 3/142; G08B 21/02; B60R 1/00; B60R 2300/105; B60R 11/04; B60R 2300/802; H04N 7/181
USPC ........................................................ 348/148
See application file for complete search history.

(56) References Cited

U.S. PATENT DOCUMENTS

| | | | | |
|---|---|---|---|---|
| 4,951,045 A | * | 8/1990 | Knapp et al. ................... | 340/944 |
| 5,083,200 A | * | 1/1992 | Deffontaines ................. | 348/148 |
| 5,793,882 A | * | 8/1998 | Piatek et al. ................... | 382/115 |
| 6,113,037 A | * | 9/2000 | Pace ............................... | 246/124 |
| 6,382,126 B1 | * | 5/2002 | Findley ......................... | 116/209 |
| 7,075,427 B1 | * | 7/2006 | Pace et al. ................. | 340/539.22 |
| 7,420,471 B2 | | 9/2008 | Frederick et al. | |
| 8,342,271 B2 | * | 1/2013 | Filippov et al. .............. | 180/9.32 |
| 8,639,408 B2 | * | 1/2014 | Anderson .................... | 701/29.3 |
| 2001/0000025 A1 | * | 3/2001 | Darrell et al. ................. | 382/103 |
| 2007/0193798 A1 | * | 8/2007 | Allard et al. ................. | 180/169 |
| 2007/0219666 A1 | * | 9/2007 | Filippov et al. .............. | 700/245 |
| 2009/0003832 A1 | * | 1/2009 | Pederson et al. ............. | 398/135 |
| 2009/0063030 A1 | * | 3/2009 | Howarter et al. ............. | 701/117 |
| 2009/0094247 A1 | * | 4/2009 | Fredlund et al. ................ | 707/10 |
| 2010/0094481 A1 | * | 4/2010 | Anderson .......................... | 701/1 |
| 2010/0127853 A1 | | 5/2010 | Hanson et al. | |
| 2010/0253501 A1 | * | 10/2010 | Gibson ......................... | 340/475 |
| 2011/0082569 A1 | * | 4/2011 | Bellville ......................... | 700/79 |
| 2011/0116720 A1 | * | 5/2011 | Gwak et al. ................... | 382/224 |
| 2011/0181728 A1 | * | 7/2011 | Tieman et al. ................ | 348/148 |
| 2011/0205033 A1 | | 8/2011 | Bandyopadhyay et al. | |
| 2011/0212717 A1 | * | 9/2011 | Rhoads et al. ................ | 455/420 |
| 2011/0309931 A1 | | 12/2011 | Rose | |

* cited by examiner

*Primary Examiner* — Shan Elahi
(74) *Attorney, Agent, or Firm* — Miller, Matthias & Hull LLP (57) ABSTRACT

A personnel classification and response system, and related method and computer program product are disclosed. The system may comprise an image capture member and a controller connected to the image capture member. Some embodiments may also comprise a ranging apparatus. The ranging apparatus may be configured to provide a distance from a person to a vehicle. The image capture member may be configured to provide an image of the vicinity of the vehicle, the image including the person. The controller may be configured to identify in the image a marker and to activate a warning apparatus based on the marker and a zone in which the marker is disposed.

20 Claims, 6 Drawing Sheets

PERSONNEL CLASSIFICATION AND RESPONSE SYSTEM

TECHNICAL FIELD

The present disclosure generally relates to warning systems and, more particularly, for such systems on vehicles used in mining, earth moving, construction, and material handling applications, and the like.

BACKGROUND

Vehicles in industrial applications may operate in work sites in which there are a variety of classes of personnel present. For example, on a worksite there may be experienced operators, new operators, engineers, supervisors, visitors, and the like. During typical operations, the different classes of personnel may be authorized to be within different distances to the vehicle. By way of illustration, a vehicle operator may be allowed within close range to a vehicle, whereas, a visitor may only be authorized to be within a more distant range of the vehicle. In some applications the vehicles may be autonomous, that is remote controlled or having programmed movement, and in other applications the vehicles may be semi-autonomous or manned. When the vehicles are autonomous, personnel straying too close to the vehicle may not be detected. In semi-autonomous or manned operations, the driver may not be able to distinguish between personnel authorized to be within a certain range of the vehicle and those that are not authorized.

U.S. Pub. No. 2010/0127853 published May 27, 2010 (the '853 Publication) discloses methods and apparatus for locating and tracking objects in a mining environment. The method discloses allowing mining personnel observing a display to see the positions of equipment and personnel. This type of system has drawbacks because of the visual clutter on the display that it provides. The system does not distinguish between the types of personnel and the zones around a machine in which it may be appropriate for the personnel to be present and the zones in which it is not appropriate. A better system is needed.

SUMMARY OF THE DISCLOSURE

In accordance with one aspect of the disclosure, a personnel classification and response system is disclosed. The system may comprise an image capture member and a controller connected to the the image capture member. The image capture member may be configured to provide an image of the vicinity of the vehicle, the image including a person. The controller may be configured to identify in the image a marker and to activate a warning apparatus based on the marker and the zone in which the marker is disposed.

In accordance with another aspect of the disclosure, a method of responding to a person in the vicinity of a vehicle is disclosed. The method may comprise processing an image of the vicinity of the vehicle to identify a marker disposed on the person, determining a zone in which the marker is present, and activating a warning apparatus based on the zone and the result of the processing step.

In accordance with a further aspect of the disclosure, a computer program product is disclosed. The computer program product may comprise a non-transitory computer usable medium having a computer readable program code embodied therein. The computer readable program code may be adapted to be executed to implement a method for responding to a person in the vicinity of a vehicle, the method comprising: receiving a signal detecting the person at a distance from the vehicle, receiving an electronic image of the vicinity of the vehicle, the image including the person, processing the image to identify the color of a marker disposed on the person, the color associated with a personnel classification, determining a zone in which the marker is present based on the distance, and activating a warning apparatus based on the zone and the color of the marker.

DETAILED DESCRIPTION

Figure 1:
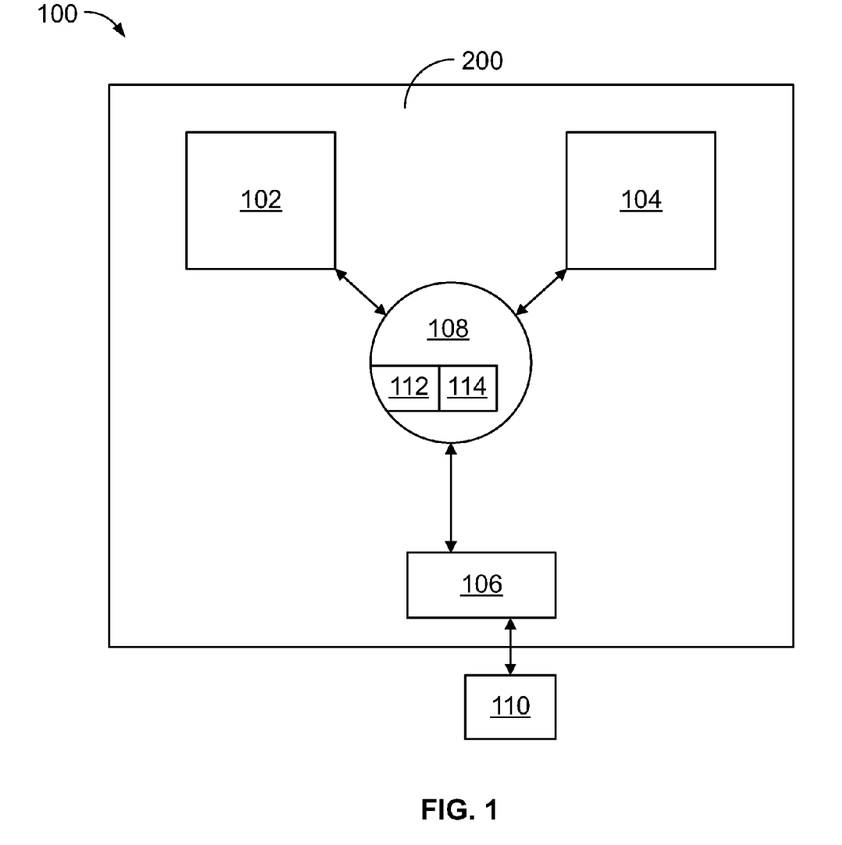
FIG. 1 is a general schematic view of an exemplary embodiment of a personnel classification and response system constructed in accordance with the teachings of this disclosure.

Referring now to the drawings, and with specific reference to FIG. 1, there is shown a personnel classification and response system in accordance with the present disclosure and generally referred to by reference numeral 100. The personnel classification and response system 100 may comprise an image capture member 104, a warning apparatus 106 and a controller 108. In some embodiments, but not all embodiments, the personnel classification and response system 100 may include a ranging apparatus 102. In addition, in some embodiments, the personnel classification and response system 100 may also include a display 110 connected to the warning apparatus 106. The display may be disposed on the vehicle (as illustrated in FIG. 2) or remote from the vehicle (as illustrated in FIG. 1).

While the following detailed description and drawings are made with reference to the system 100 mounted on a haul truck, the teachings of this disclosure may be employed on other mining, earth moving, construction, material handling, or the like vehicles. Such vehicles may be autonomously, semi-autonomously, or manually operated.

Figure 2:
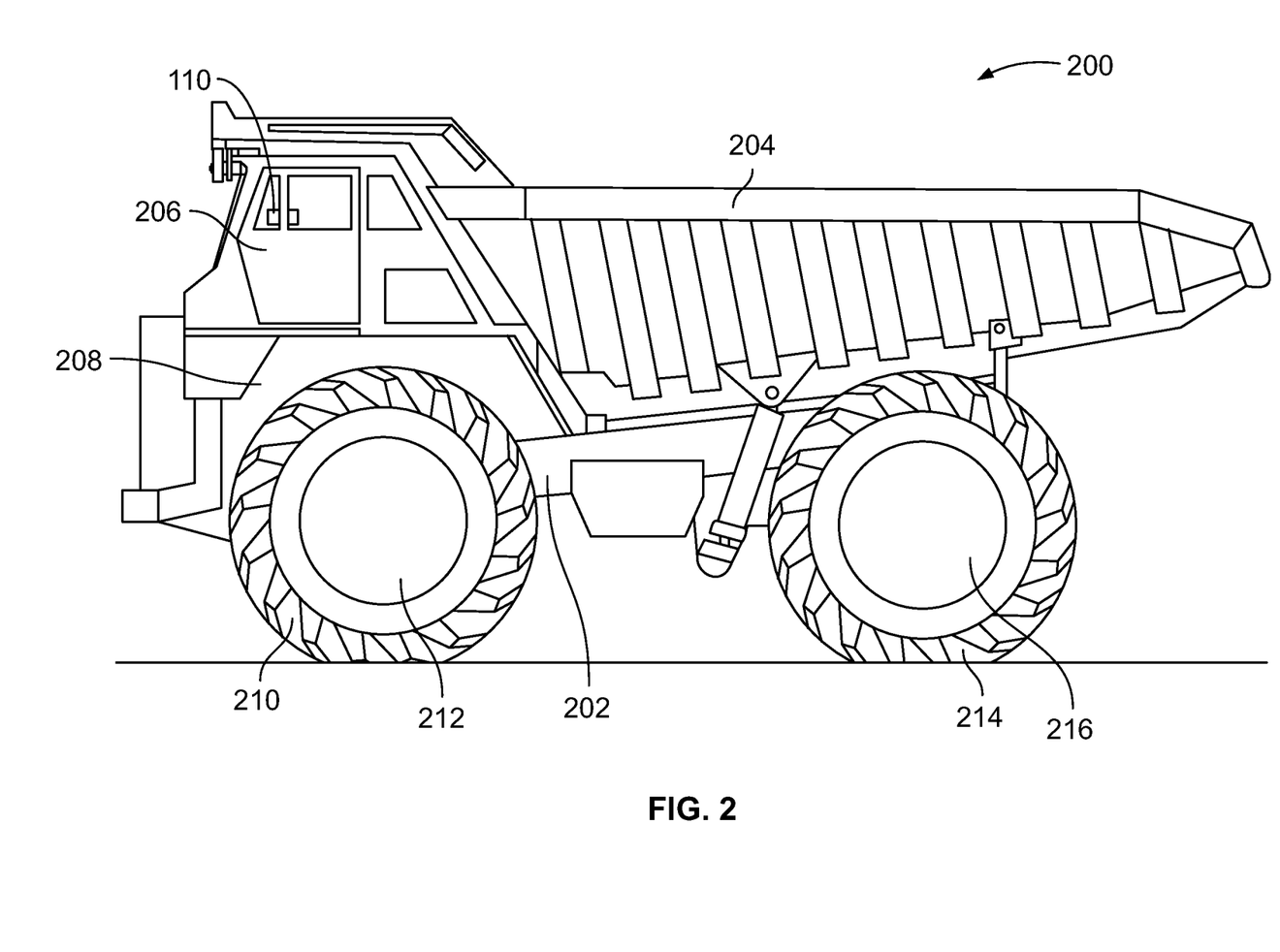
FIG. 2 is perspective view of an embodiment of an exemplary vehicle in which a personnel classification and response system in accordance with the teachings of this disclosure is used.

FIG. 2 illustrates one example of a vehicle 200 that incorporates the features of the present disclosure. The vehicle may be autonomous, that is remote controlled or having programmed movement, or may be semi-autonomous (having partially remote controlled or programmed functions), or may be manually operated. The vehicle 200 generally includes a main frame 202, a dump body 204 pivotally mounted to the main frame 202, and a cab 206 mounted on the front of the main frame 202 above an engine enclosure 208. The vehicle 200 is supported on the ground by front tires 210 (one shown) each mounted on one of two front wheel assemblies 212, and rear tires 214 (one shown) each mounted on one of two back (driven) wheel assemblies 216. One or more engines (not shown) may be housed within the engine enclosure 208 to supply power to the drive wheel assemblies 216 via a mechanical or electric drive train. In some embodiments, a user interface such as a display 110 may be disposed in the cab 206 of the vehicle 200.

Turning back to FIG. 1, the ranging apparatus 102 may be connected to the controller 108 and may be any appropriate type of ranging apparatus as is known in the art for detecting objects or people at a distance. Such ranging apparatus 102 may include, but are not limited to, systems and apparatus for radar, lidar, and the like. Generally, in embodiments that include a ranging apparatus 102, some or all of the ranging apparatus 102 may be mounted to the vehicle 200. However, in various embodiments, some or all of the ranging apparatus may be remote from the vehicle 200. For example, a ranging apparatus 102 such as a Global Positioning System (GPS) may have some or all of its components remote from the vehicle 200.

The ranging apparatus 102 may determine the distance, D (see FIG. 3), at which a person is located in relation to the vehicle 200 and may transmit that information to the controller 108. The ranging apparatus 102 may also provide to the controller 108 the direction the person is heading, the speed of the person and/or the altitude of the person. In one embodiment, the ranging apparatus 102 may be mounted on the vehicle 200 and may be a radar system that uses radio waves to determine the range, altitude, direction or speed of an object. Such a radar system may include one or more transmitters and one or more receivers mounted on the vehicle to provide desired detection coverage.

The image capture member 104 may be an optical apparatus having an optical lens or other imaging device or image sensor at one end and capable of capturing and transmitting images or videos through a communication channel to the controller 108 for processing. The communication channel may be an optical channel, or any other wired, wireless or radio channel or any other type of channel capable of transmitting images or videos between two points. In one embodiment, the image capture member 104 may be a camera. One or more image capture member(s) 104 may be mounted to the vehicle 200. For example, in one embodiment, an image capture member 104 may be mounted to each of the four sides of a vehicle (front, back, left side and right side). In other embodiments, fewer or greater quantities of image capture members 104 may be utilized.

At least one warning apparatus 106 may be connected to the controller 108. The warning apparatus 106 may include, but is not limited to, a visual display screen, a horn, lights, flashing lights, vibrator, buzzer or the like. A warning apparatus 106 may be a device that shuts off, slows down or temporarily halts the operation of a vehicle 200 or notifies the operator of the detection of a personnel marker 116 (discussed herein later). An auditory warning apparatus may increase the volume and or frequency of a warning sound with increasing proximity of a hazard. A visual warning apparatus may increase, on a display screen or vehicle, the number of activated warning lights, the brightness, color or frequency of flashing of the lights with increasing proximity of the marker 116.

The controller 108 may include a processor 112 and a memory component 114. The controller 108 may be operably connected to the image capture member 104 and the warning apparatus 106. In embodiments that include a ranging apparatus 102, the controller 108 may be operably connected to the ranging apparatus 102 as well. The processor 112 may be a microprocessor or other processor as known in the art. The processor 112 may execute instructions and generate control signals for image processing, determining the vehicle zones 118, classifying markers 116 and activating the warning apparatus 106 based on the marker 116 and the zone 118 in which it is present. Such instructions may be read into or incorporated into a computer readable medium, such as the memory component 114 or provided external to the processor 112. In alternative embodiments, hard wired circuitry may be used in place of, or in combination with, software instructions to implement a control method.

The term "computer readable medium" as used herein refers to any non-transitory medium or combination of media that participates in providing instructions to the processor 112 for execution. Such a medium may comprise all computer readable media except for a transitory, propagating signal. Common forms of computer-readable media include, for example, a floppy disk, a flexible disk, hard disk, magnetic tape, or any other magnetic medium, a CD-ROM, any other optical medium, or any other medium from which a computer processor 112 can read.

The controller 108 is not limited to one processor 112 and memory component 114. The controller 108 may be several processors 112 and memory components 114.

In one embodiment, the controller 108 may receive an image from an image capture member 104 and process the image (or series of images in a video feed) to identify a marker 116 in the image(s). In embodiments that include a ranging apparatus, the controller 108 may receive a signal or signals from a ranging apparatus indicating that a person has been detected at a distance, D, from the vehicle 200. In some embodiments, this information (distance D) may be used by the controller 108 to assist with processing of the image to identify the marker 116 in the image. The controller may also be configured to retrieve from the memory 114 the machine zones 118 and zone boundaries 120 for a set of machine parameters, to classify the marker 116, and to activate a warning apparatus 106 based on the marker 116 and the zones 118 in which it is present.

Industrial Applicability

Figure 3:
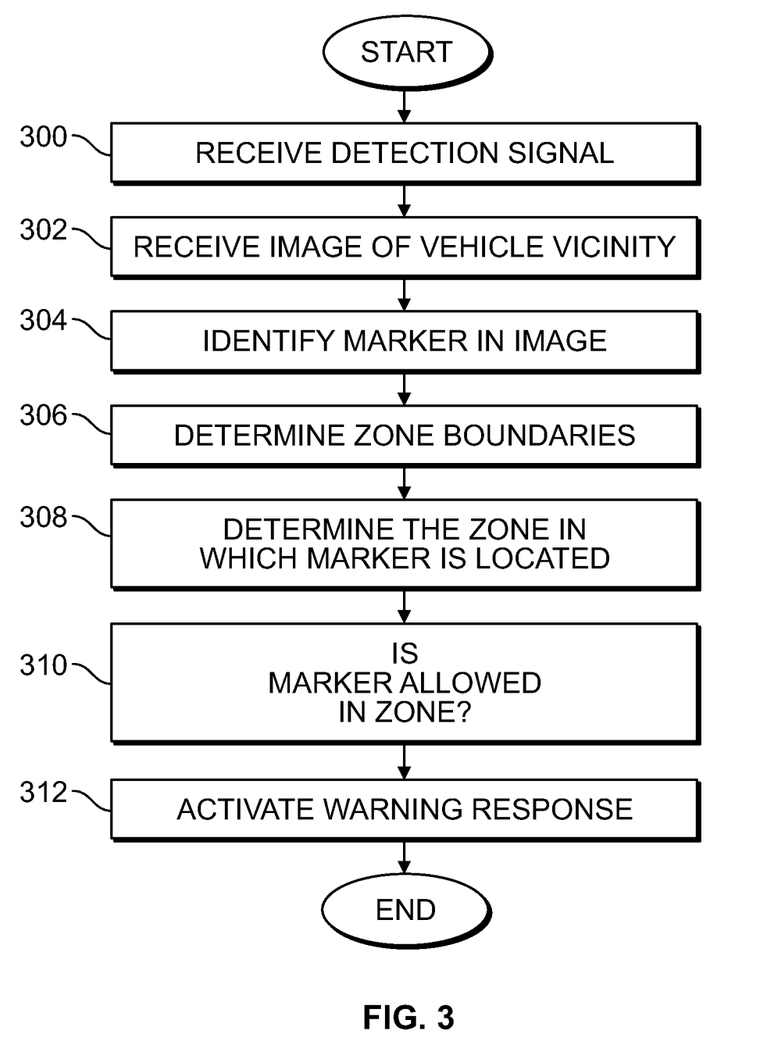
FIG. 3 is flowchart illustrating exemplary steps of a method of responding to a person in the vicinity of a vehicle in accordance with the teachings of this disclosure.

Referring now to FIG. 3, an exemplary flowchart is illustrated showing sample steps which may be followed in detecting personnel, classifying such personnel and responding to the proximity of such personnel. The method may be practiced with more or less than the number of steps shown and is not limited to the order shown. Step 300 of the method includes receiving, by a controller 108, a signal indicating that a person has been detected in the proximity of a vehicle 200. As noted previously, the signal may be provided by any appropriate type of ranging apparatus 102 known in the art for detecting people at a distance. Step 300 may also include receiving, by the controller 108 from a ranging apparatus 102, a determination of the distance, D, at which the person is located in relation to the vehicle 200. In an alternative embodiment, the distance D may be calculated by the controller 108 based on information received from the ranging apparatus 102. In some embodiments, the controller 108 may also receive from the ranging apparatus information related to the direction the person is heading, the speed of the person and/or the altitude of the person.

In step 302 an image is received by the controller 108 of the vicinity of the vehicle. The image may include the detected person. The image may be received from the image capture member 104. The image may be a single image or may be multiple images in a video feed. In embodiments that do not include a ranging apparatus, step 300 may be skipped and the method may begin at step 302 with an image received by the controller 108 of the vicinity of the vehicle, the image including a person.

In step 304, the image is processed by the controller 108 to determine whether a marker 116 is present in the image. This processing may be done using known technology. For example, algorithms using part based models, such as the "Deformable Parts Model," and the like, may be utilized. Other appropriate algorithms may also be used.

In one embodiment, one or more segments of the image may be processed to determine whether a marker 116 is present in the image. For example, information received from the ranging apparatus 102 related to the distance, D, at which person was detected may be utilized by the controller 108 to identify a segment of the image for processing. The controller 108 may then process that segment of the image to determine whether the marker 116 is present. Alternatively, the entire image may be processed to determine whether the marker 116 is present.

The marker 116 may be an object, label, tag, geometric symbol or pattern, bar code, QR code, or the like. The marker 116 may be colored, black and white, grey tone, or reflective. The marker 116 may be disposed on an object carried or worn by the person. For example, the marker 116 may be a colored helmet or vest worn by the person. In the example of a colored helmet marker 116, the controller 108 may process the image to identify whether a helmet is visible in the image and the color of the helmet. Pixel sampling, thresholding, or other methodologies known in the art may be used to determine the color of the marker 116.

Once the marker 116 has been identified as visible in the image, the method proceeds to step 306. In step 306, the zones 118 around the vehicle 200 are determined by the processor 108 for a set of vehicle 200 parameters.

Figure 4:
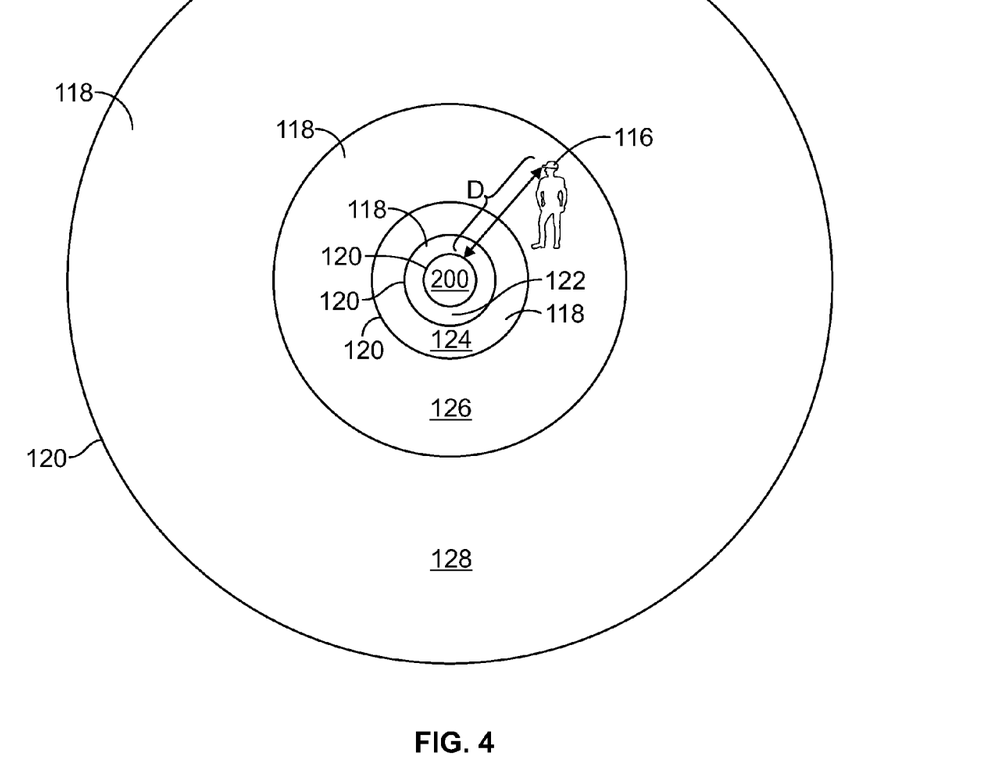
FIG. 4 is a schematic of one embodiment of the zones around a vehicle, in accordance with the teachings of this disclosure.

Each vehicle may have one or more zones 118 associated with it. FIG. 4 illustrates a vehicle 200 with four zones 118 around it. In the embodiment illustrated in FIG. 4, the zones 118 are generally concentric, although they do not need to be concentric in shape and relation to each other. In other embodiments, there may be a greater or lesser number zones 118 associated with the vehicle 200. The controller 108 may be configured to utilize a lookup table, or the like, to determine the number of zones 118 for the vehicle 200 and the boundaries 120 of those zones 118.

The boundaries 120 of a zone 118 may vary depending on one or more of the following vehicle parameters: the type of vehicle 200, the operational mode of the vehicle (autonomous, semi-autonomous, or manual), and the functional mode of the vehicle (e.g., parked, traveling, digging, cutting). The functional mode choices may be based on the type of vehicle 200 and its attachments. In some embodiments, the range of a particular zone 118 may also vary depending on vehicle parameters such as the travel speed of the moving vehicle 200 and whether the vehicle 200 is loaded, partially loaded, or empty. A plurality of vehicle parameters use to determine applicable zone 118 boundaries 120 for a vehicle 200 may be referred to herein as a set of vehicle parameters.

Figure 5:
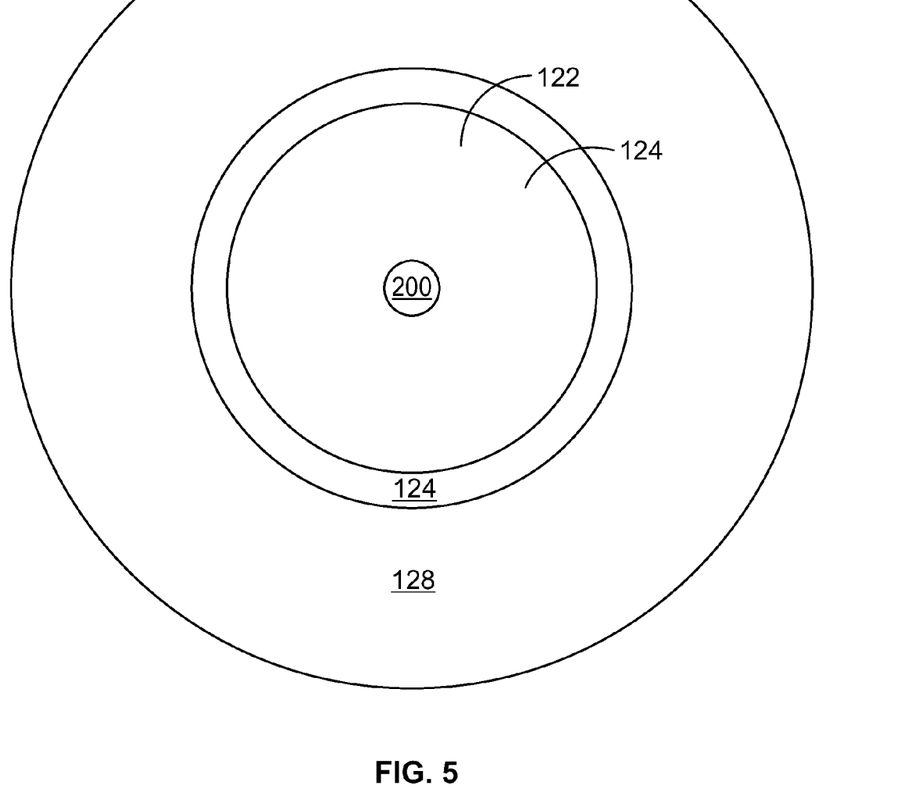
FIG. 5 is a schematic of another embodiment of the zones around a vehicle, in accordance with the teachings of this disclosure.

For example, as illustrated in FIG. 4, there may be four concentric generally ring shaped zones 118 defined for an autonomous haul truck 200. When the vehicle 200 is in an unloaded state, having an autonomous operational mode and a parked functional mode, the first zone 122 may extend from about 0 meters to about 5 meters from the vehicle 200, the second zone 124 may extend between about 5 meters to about 10 meters from the machine 200, the third zone 126 may extend between about 10 meters to about 40 meters, and the fourth zone 128 may extend between about 40 meters to about 100 meters from the vehicle 200. Whereas, as illustrated in FIG. 5, when the autonomous haul truck 200 is fully loaded and traveling (functional mode) at a speed between 3.5 m/s to about 6 m/s, the zone 118 boundaries 120 change from that illustrated in FIG. 4 such that the first zone 122 may now extend from about 0 meters to about 50 meters, the second zone 124 may overlap the first zone 122 and extend between about 0 meters to about 50 meters, the third zone 126 may extend between about 50 meters to about 70 meters, and the fourth zone 128 may extend between about 70 meters to about 100 meters.

Figure 6:
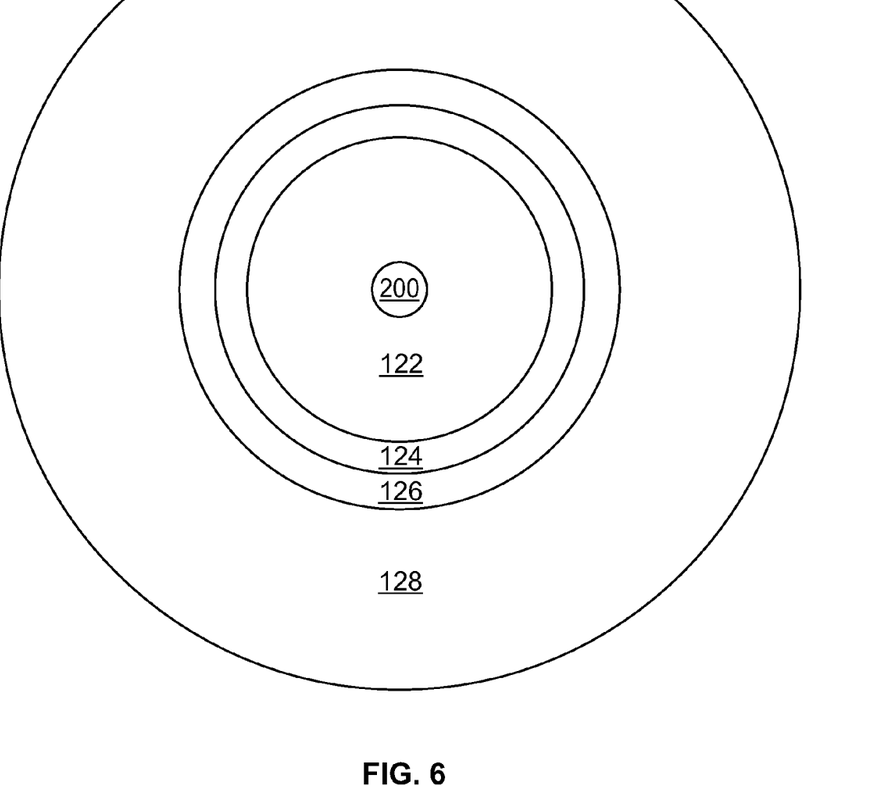
FIG. 6 is a schematic of another embodiment of the zones around a vehicle, in accordance with the teachings of this disclosure

In the next example illustrated in FIG. 6, the operational mode for the haul truck 200 is manned instead of autonomous, and while there may be still four zones 118, the boundaries 120 of the zones 118 may be different than in the previous scenarios. The haul truck 200 is still fully loaded and traveling (functional mode) at a speed between 3.5 m/s to about 6 m/s. The first zone 122 may now extend from about 0 meters to about 30 meters, the second zone 124 may extend between about 30 meters to about 40 meters, the third zone 118 may extend between about 40 meters to about 50 meters, and the fourth zone 128 may extend between about 50 meters to about 100 meters.

In step 308, the controller 108 identifies the zone 118 in which the marker 116 is present. The identification of the zone 118 may be based on the distance, D, of the marker 116 from the vehicle 200. The distance D, if not provided by or calculated from information provided by the ranging apparatus, may alternatively be determined by the controller in step 304 as part of the image processing.

In step 310, the controller determines whether the marker 116 is allowed in the zone 118. Each zone 118 may have one or more markers 116 mapped to it. Each marker 116 may be associated with a personnel classification. For example, in one embodiment, there may be four personnel classifications each with a different color of marker 116 associated with it: vehicle operators, onsite engineers, new operators, supervisors and visitors. In other embodiments, there may be more or less or different personnel classifications. Personnel at a work site may be asked to wear or visibly display a marker 116 that is associated their appropriate personnel classification. This allows the controller 108 to identify the classification of the person in the image based on the marker 116 disposed on him and to customize the warning response based on the zone 118 in which the person is located. In other embodiments, each personnel classification may be associated with a different bar code or QR code, or geometric symbol, or the like.

In one embodiment, a marker 116 associated with an onsite engineer classification may be mapped to all zones 118 (meaning, the on-site engineer is allowed in all zones 118 around the vehicle 200). A marker 116 associated with a vehicle operator classification may also be mapped to all zones 118. A marker associated with new operator classification may be mapped to all zones 118 except the first zone 122, a marker associated with the supervisor classification may be mapped to all zones except the first and second zones 122, 124, and a marker 118 associated with the visitor classification may be mapped only to the fourth zone 128.

In step 312, the controller 108 determines the appropriate warning response, if any, based on the marker 116 and the zone 118 in which the marker 116 is present. The controller 108 may utilize a look up table or hash table or other structure to determine the warning response. The controller 108 may then activate the warning apparatus 106 based on the marker 116 and the zone 118 in which it is located.

For example in an embodiment based on the autonomous haul truck 200 scenarios (FIGS. 4-5) discussed above, if the marker 116 is in the first zone 122 and the marker 116 is associated with a visitor classification, the controller 108 may cause the warning apparatus 106 to shut off the operation of the vehicle 200 because the marker 116 associated with the visitor classification is not mapped to the first zone 124. However, if the marker 116 associated with the visitor classification is present in the fourth zone 128 (an allowed zone, in this example, for the visitor classification), no warning action may be taken, or alternatively, the controller 108 may cause the warning apparatus 106 to activate a video image on a display 110 (a remote display, in this embodiment) and highlight the marker 116 on the image displayed.

In yet another embodiment, the controller 108 may cause the warning apparatus 106 to activate a bar graph on the display 110 indicating how relatively close the marker 116 is to entering a zone in which the marker 116 is not allowed. Alternatively, or in addition to, the controller 108 may cause the warning apparatus 106 to activate warning lights or buzzers on the vehicle 200. In scenarios where the vehicle 200 is manned, the controller 108 may, in some embodiments, cause the warning apparatus 106 to activate a video image on a display 110 inside the cab 206 of the vehicle 200 and highlight the marker 116 on the image displayed and/or activate a bar graph on the display 110 indicating how relatively close the marker 116 is to entering a zone in which the marker 116 is not allowed. Other types of warning actions may be taken instead of or in addition to the above.

Also disclosed is a computer program product, comprising a non-transitory computer usable medium having a computer readable program code embodied therein, the computer readable program code adapted to be executed to implement a method for responding to a person in the vicinity of a vehicle, the method comprising receiving a signal detecting the person at a distance from the vehicle, receiving an electronic image of the vicinity of the vehicle, the image including the person, processing the image to identify the color of a marker disposed on the person, the color associated with a personnel classification, determining a zone in which the marker is present based on the distance, and activating a warning apparatus based on the zone and the color of the marker.

The features disclosed herein may be particularly beneficial for use with autonomous, semi-autonomous and manned mining, earth moving, construction or material handling vehicles.

What is claimed is:

1. A personnel classification and response system comprising:
   an image capture member that provides an image of the vicinity of a vehicle, the image including a person and a marker disposed on the person; and
   a controller connected to the image capture member, the controller configured to identify in the image the marker and to activate a warning apparatus based on the marker and a zone relative to the vehicle in which the marker is located.

2. The personnel classification and response system of claim 1, wherein the marker is a colored marker and the controller is configured to determine the color of the marker and to activate a warning apparatus based on the color of the marker and the zone in which the marker is disposed.

3. The personnel classification and response system of claim 2, wherein the color of the marker is associated with a personnel classification.

4. The personnel classification and response system of claim 1, wherein the warning apparatus stops operation of the vehicle if the marker is not allowed in the zone.

5. The personnel classification and response system of claim 1, wherein the controller is configured to determine a first boundary range for the zone based on a first set of vehicle parameters.

6. The personnel classification and response system of claim 5, wherein the controller is configured to determine a second boundary range for the zone based on a second set of vehicle parameters, the first boundary range different from the second boundary range and the first set of vehicle parameters different from the second set of vehicle parameters.

7. The personnel classification and response system of claim 1, further comprising a ranging apparatus connected to the controller, the ranging apparatus configured to provide a distance from the person to the vehicle, wherein the vehicle is an autonomous vehicle.

8. A method of responding to a person in the vicinity of a vehicle, the method comprising:
   processing an image of the vicinity of the vehicle to identify a marker disposed on the person;
   determining a zone relative to the vehicle in which the marker is present; and
   activating a warning apparatus based on the zone and the result of the processing step.

9. The method of claim 8, in which the processing step further includes identifying the color of the marker.

10. The method of claim 9, wherein the color of the marker is associated with a personnel classification.

11. The method of claim 9, wherein the warning apparatus stops operation of the vehicle if the marker is not allowed in the zone.

12. The method of claim 11, wherein the vehicle is an autonomous vehicle.

13. The method of claim 9, wherein the warning apparatus slows operation of the vehicle if the marker is not allowed in the zone.

14. The method of claim 9, wherein the warning apparatus causes the image to be displayed on a display if the marker is not allowed in the zone.

15. The method of claim 14, wherein the warning apparatus causes the marker to be highlighted in the image displayed if the marker is not allowed in the zone.

16. The method of claim 14, wherein the display is in the cab of the vehicle.

17. The method of claim 8, further comprising determining a boundary range for the zone based on a first set of vehicle parameters.

18. The method of claim 17, further comprising determining second boundary range for the zone based on a second set of vehicle parameters, the second range different from the first range.

19. The method of claim 17, further comprising receiving a signal detecting the person at a first distance from the vehicle, wherein the zone is determined based on the first distance.

20. A computer program product comprising a non-transitory computer usable medium having a computer readable program code embodied therein, the computer readable program code adapted to be executed to implement a method for responding to a person in the vicinity of a vehicle, the method comprising:
   receiving a signal detecting the person at a distance from the vehicle;
   receiving an electronic image of the vicinity of the vehicle, the image including the person;
   processing the image to identify the color of a marker disposed on the person, the color associated with a personnel classification;
   determining a zone relative to the vehicle in which the marker is present based on the distance; and activating a warning apparatus based on the zone and the color of the marker.

* * * * *